United States Patent [19]
Fukuzawa et al.

[11] Patent Number: 5,412,201
[45] Date of Patent: May 2, 1995

[54] IMAGE READING APPARATUS WITH SPLIT POSITION DETECTION

[75] Inventors: Nobumasa Fukuzawa, Yokohama; Akiyoshi Kimura; Satoru Kutsuwada, both of Kawasaki, all of Japan

[73] Assignee: Canon Kabushiki Kaisha, Tokyo, Japan

[21] Appl. No.: 62,218

[22] Filed: May 18, 1993

[30] Foreign Application Priority Data

May 20, 1992 [JP] Japan .................................. 4-151206

[51] Int. Cl.⁶ ............................................. H01J 40/14
[52] U.S. Cl. ................................. 250/208.1; 250/234; 250/237 R
[58] Field of Search ................ 250/208.1, 237 R, 234, 250/235; 358/468, 494, 497; 355/55

[56] References Cited

U.S. PATENT DOCUMENTS 5,060,283 10/1991 Shiraishi .......................... 250/237 R

FOREIGN PATENT DOCUMENTS 3179868 8/1991 Japan .

Primary Examiner—David C. Nelms
Attorney, Agent, or Firm—Fitzpatrick, Cella, Harper, Scinto

[57] ABSTRACT

An image reading apparatus is provided with a scanning optical system movable to scan an original, the scanning optical system having a slit for passing therethrough part of light from the original, a sensor for reading the light passed through the slit, and detecting means for detecting the relative positional relationship between the slit and the sensor. The detection by the detecting means is effected at a plurality of detecting positions in the direction of movement of the scanning optical system.

26 Claims, 8 Drawing Sheets

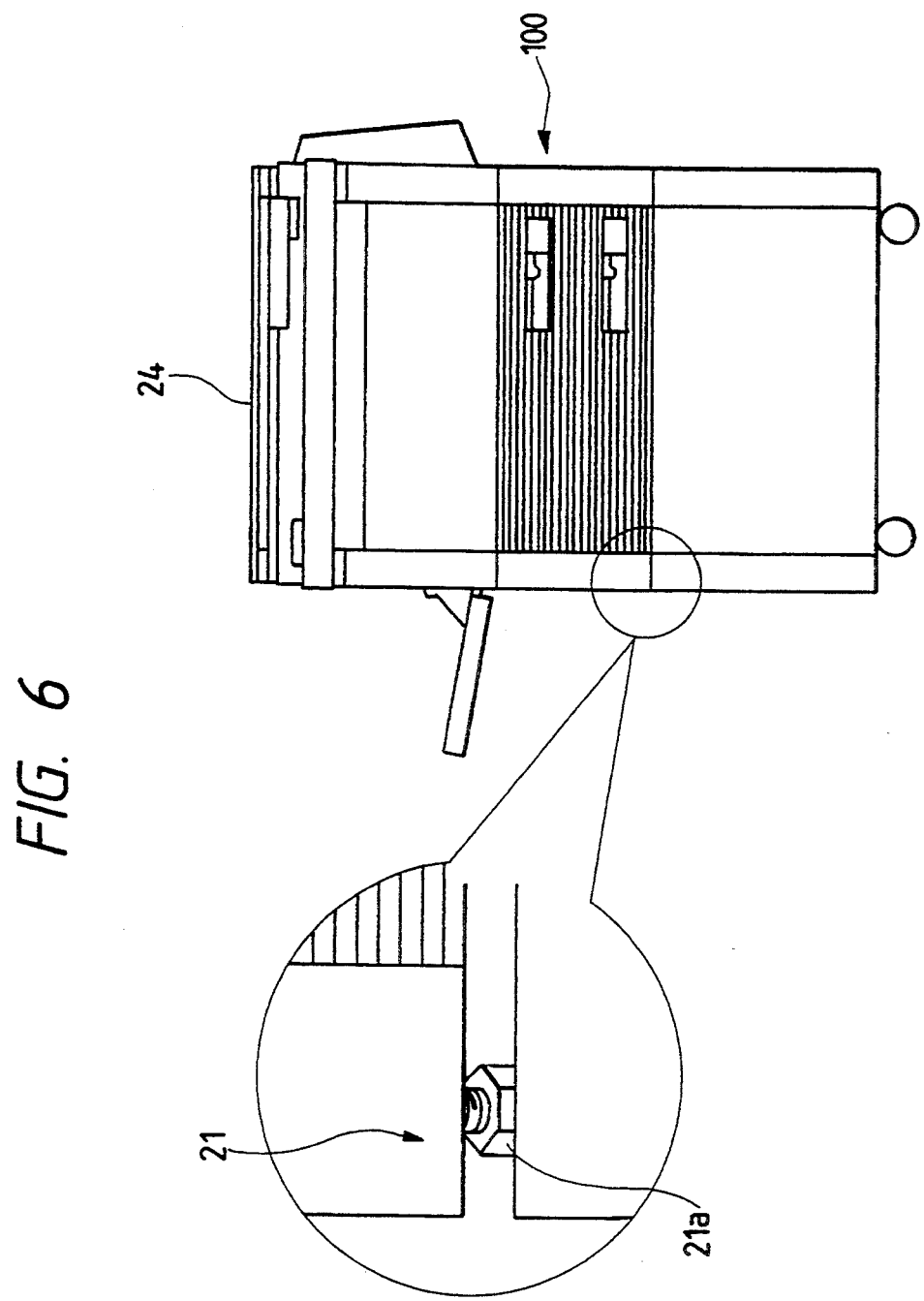

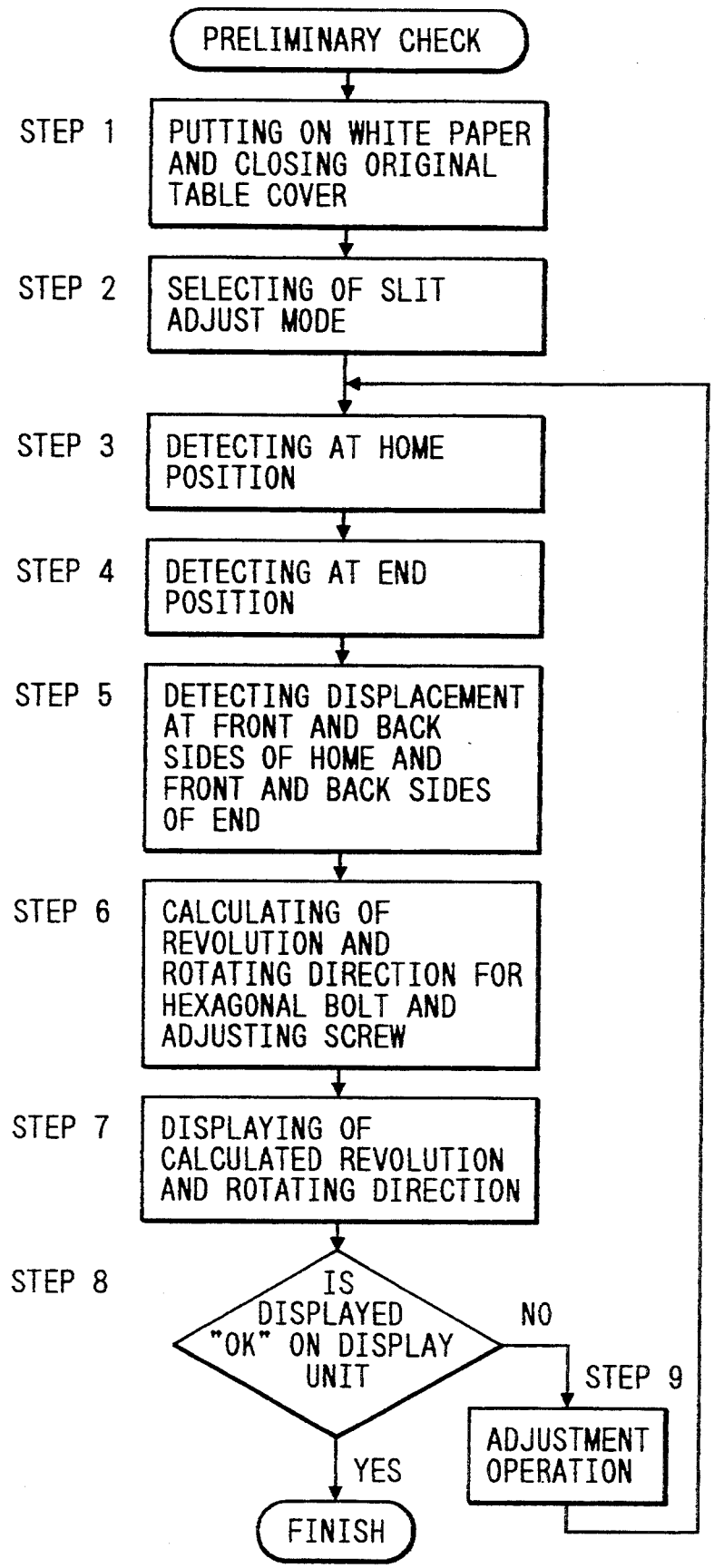

IMAGE READING APPARATUS WITH SPLIT POSITION DETECTION

BACKGROUND OF THE INVENTION

1. Field of the Invention

This invention relates to an image reading apparatus for digitally reading image light from an original by a sensor through a slit.

2. Related Background Art

The relative alignment (such as positioning in a sub-scanning direction and inclination) of a slit and a line sensor in an image reading apparatus has heretofore been done during the assemblage of the image reading apparatus. That is, it has been highly accurately done in a well-equipped factory by the use of a jig exclusively for use for optical adjustment.

However, when installing and using an image reading apparatus in the market, there arises a problem that distortion is created in the entire apparatus due to the vibration or fall of the apparatus by transportation or the like or to the planarity or the like of the installation plane and the relative positional relationship between a slit and a line sensor shifts to thereby reduce image reading accuracy.

Particularly, in an apparatus as shown in Japanese Laid-Open Patent Application No. 3-179868 previously proposed by the applicant wherein a light beam from a colored image is separated into three color lights such as R (red), G (green) and B (blue) by color resolving means using a diffraction grating and the colored image is read on the basis of said three color lights, the positional accuracy of the light beam incident on the diffraction grating has been very severe and very high accuracy has been required of the position of the slit.

So, the applicant has previously proposed in U.S. Application Ser. No. 863782 , now U.S. Pat. No. 5,283,698 an apparatus in which a scanning optical system is provided with means for detecting the relative position between a slit for forming an image on a line sensor provided in the scanning optical system.

In this apparatus, however, there has been a problem that the detection of the relative positional relationship between the slit and the line sensor is only effected at one location such as the home position corresponding to the back side of the shading correcting plate of an original supporting table and the image of the whole glass of the original supporting table cannot the ensured.

SUMMARY OF THE INVENTION

It is an object of the present invention to provide an apparatus in which the relative positional relationship between a slit and a sensor is kept correct over the whole surface of an original supporting table.

It it another object of the present invention to provide an apparatus in which the relative positional relationship between a slit and a sensor is detected at a plurality of positions.

It is still another object of the present invention to provide an apparatus in which a cut-away portion is provided in a reference member when an original is placed and the relative positional relationship between a slit and a senosr is detected by the cut-away portion.

Further objects of the present invention will become apparent from the following description.

BRIEF DESCRIPTION OF THE DRAWINGS

FIG. 6 shows height adjusting means in the embodiment of the present invention.

FIG. 8 is a flow chart of the relative position detecting operation of the embodiment of the present invention.

DESCRIPTION OF THE PREFERRED EMBODIMENTS

Some embodiments of the present invention will hereinafter be described with reference to the drawings.

Figure 1:
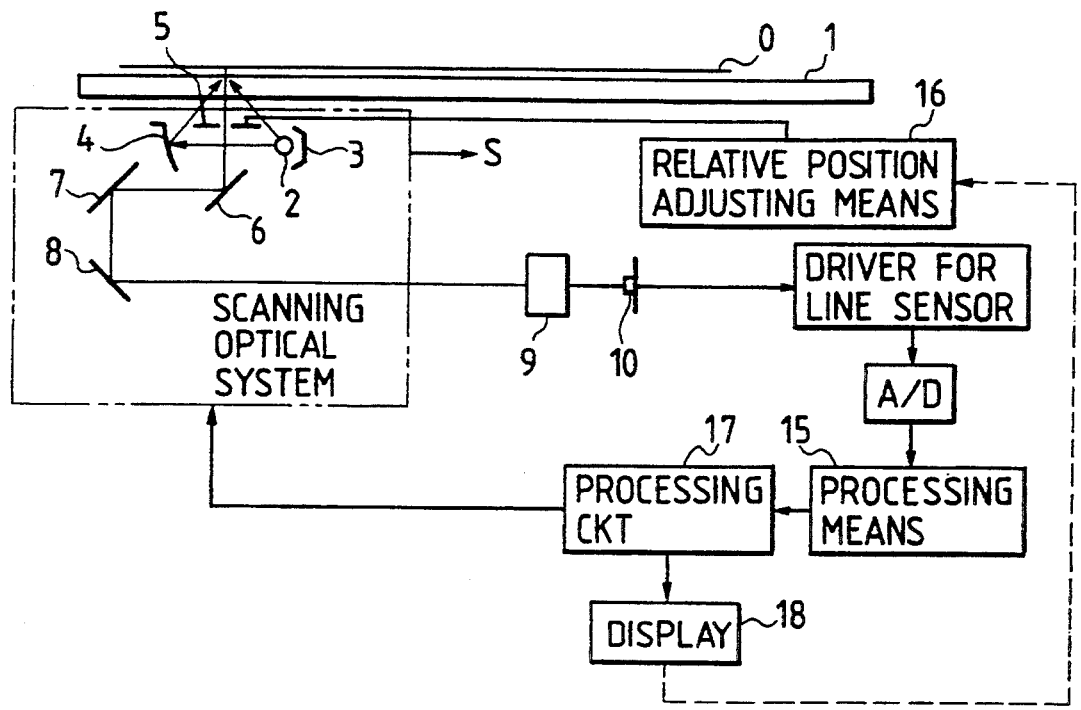
FIG. 1 is a schematic diagram of an image reading apparatus which is an embodiment of the present invention.

FIG. 1 is a schematic diagram of the whole of an image reading apparatus to which the present invention is applied. In FIG. 1, an original 0 placed on original supporting table glass 1 is illuminated by a halogen lamp 2 which is a light source through reflectors 3 and 4. Image light from the original 0 illuminated by the halogen lamp 2 is regulated by a slit 5 so that part of the image light may be intercepted and the other part of the image light may pass. The light passed through the slit 5 enters a lens 9 via reflecting mirrors 6, 7 and 8, and this light is imaged on a line sensor 10 comprising photoelectric conversion elements arranged in the form of a straight line.

The halogen lamp 2, the reflectors 3, 4, the slit 5 and the reflecting mirror 6 together constitute a first scanning optical system, and the reflecting mirrors 7 and 8 together constitute a second scanning optical system. The first scanning optical system is moved at a velocity V in the direction of arrow S and the second scanning optical system is moved at a velocity $\frac{1}{2}$V in the direction of arrow S whereby the scanning of the entire original is accomplished, and the image of the original is read by the line sensor 10 placed in a direction orthogonal to the scanning direction.

Figure 2B:
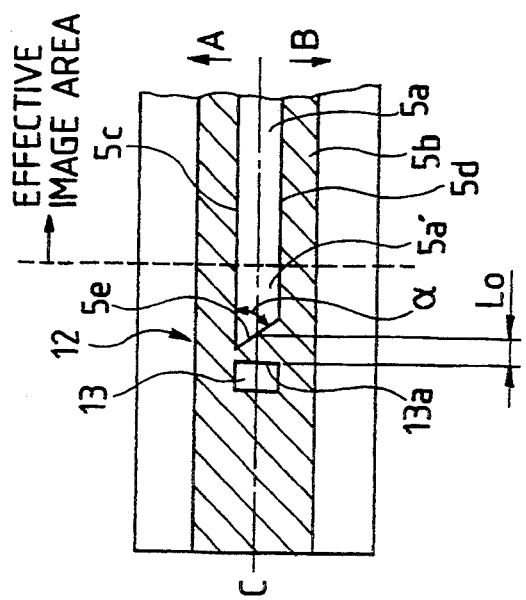
FIG. 2B is a top plan view of the end portion of the slit of FIG. 2A.
Figure 2A:
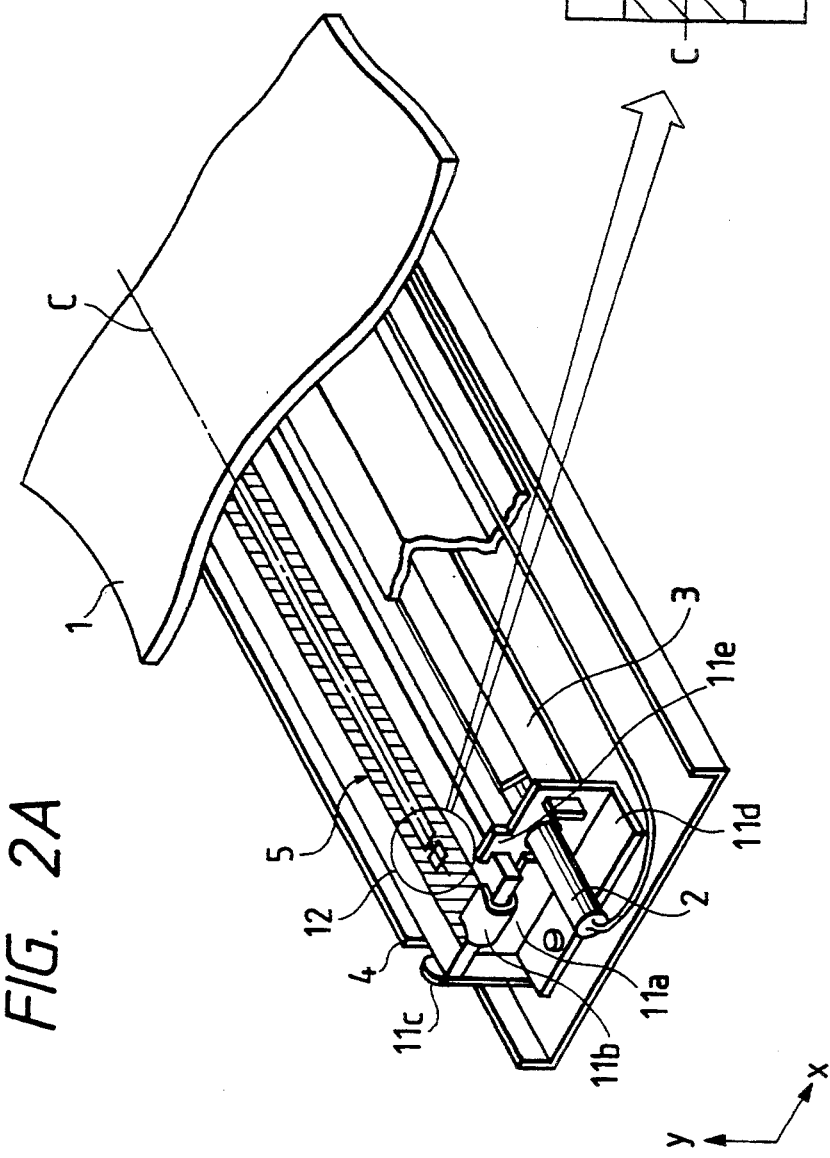
FIG. 2A is a perspective view of a scanning optical system in the embodiment of the present invention.

FIG. 2A is a perspective view of the first scanning optical system, and FIG. 2B is a top plan view of the slit end portion thereof.

In FIGS. 2A and 2B, the slit 5 extends long in a direction orthogonal to the direction of movement of the first scanning optical system, and a chart opening portion 12 for detecting the relative positional relationship between the slit 5 and the line sensor 10 is provided outside the effective image reading area of the image reading apparatus which is the opposite end portions (in FIG. 2A, one end portion alone is shown) of the slit. The chart opening portion 12 is formed with a rectangular opening portion 13 and a slit end opening portion 5a′ which is an extension from a slit opening portion 5a and in which an end edge 5e is obliquely formed. The reference character 5b designates the light intercepting portion of the slit, and the reference characters 5c and 5d denote the edges of the slit.

The slit 5 is supported by support members 11a, 11b, 11c, 11d and 11e.

Now, as previously described, in a factory, optical adjustment is done by the use of a jig for exclusive use and relative position adjustment is done by relative position adjusting means 16 (see FIG. 1) so that the line sensor 10 may read the center C of the slit 5. In the market, however, as previously described, the relative position between the slit 5 and the line sensor 10 shifts due to the vibration or fall by transportation or the poor planarity of the place on which the image reading apparatus is installed and thus, the reading position of the line sensor 10 does not lie at the center C of the slit in FIG. 2B but deviates in the direction of arrow A or B.

So, as shown in FIGS. 2A and 2B, the edge 5e of the slit opening 5a′ is inclined in the chart opening portion 12 at the opposite ends (which are symmetrical although in FIG. 2A, one end alone is shown) and at the same time, rectangular opening portions 13 are provided at the opposite slit ends of the light intercepting portion 5b. Design is made such that the relative position between the slit 5 and the line sensor 10 is detected from the line sensor output of the chart opening portion 12.

That is, there is constructed relative position detecting means having the chart opening portion 12 in which the lengthwise distance between the edge 13a of the rectangular opening portions 13 provided at the opposite ends outside the lengthwise effective image area of the slit 5 and the slit edge 5e of the slit end opening portion 5a′ differs in the widthwise direction (the direction orthogonal to the lengthwise direction).

The slit is formed by printing a light intercepting screen on a transparent member of a material such as glass.

Description will now be made of a method of detecting the relative positional relationship between the slit and the line sensor.

An original such as white paper or a standard original such as a shading plate is first illuminated by the halogen lamp 2, and then the light from this standard original is read by the line sensor, which thus outputs an electrical signal.

Figure 3:
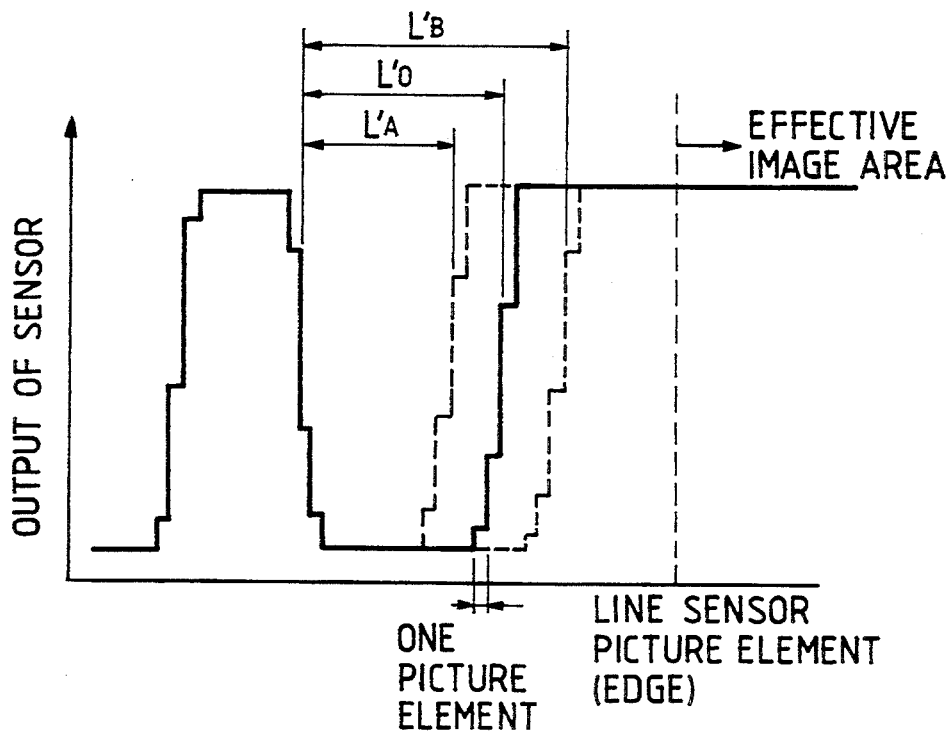
FIG. 3 shows the output from a line sensor in the embodiment of the present invention.

At that time, the output of the line sensor corresponding to the chart opening portion 12 at the opposite ends of the slit becomes such as shown in FIG. 3. When the line sensor 10 is reading the center C of the slit, the spacing between the edge 13a of the rectangular opening portion 13 provided in the endmost portion of the slit 5 and the slit edge 5e having an inclination is $L_O$ and the output of the line sensor is $L_{O'}$ picture elements. When the line sensor 10 is reading a position deviating in the direction of arrow A from the center C of the slit, the output of the line sensor for the edge 13a of the rectangular opening portion 13 and the slit edge 5e having an inclination is $L_{A'}$ picture elements ($L_{A'} < L_{O'}$), and conversely, when the line sensor 10 is reading a position deviating in the direction of arrow B from the center C of the slit, the output of the line sensor for the edge 13a of the rectangular opening portion 13 and the slit edge 5e having an inclination is $L_{B'}$ picture elements ($L_{B'} > L_{O'}$). From what has been described above, it will be seen that L′ picture elements corresponding to the output interval between the edge 13a of the rectangular opening portion 13 and the slit edge 5e having an inclination in the output of the line sensor obtained from the chart opening portion 12 at the opposite ends of the slit is compared with the center value $L_{O'}$ by processing means 15, whereby the direction of deviation (A or B) of the line sensor relative to the slit can be known.

Figure 4:
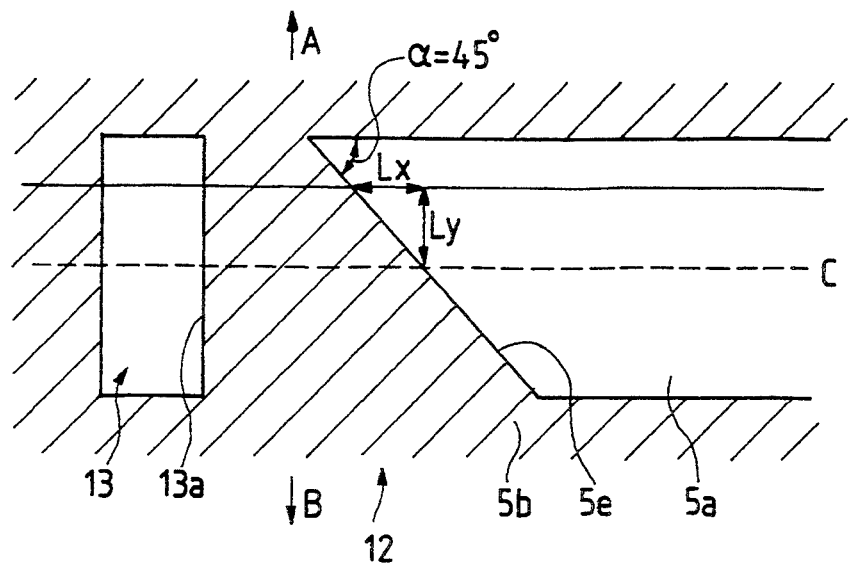
FIG. 4 is an enlarged view of a chart opening portion in the embodiment of the present invention.

Also, by predetermining the angle of the inclination of the slit edge 5e, not only the direction of deviation but also the amount of deviation can be detected. When for example, the inclination α of the slit edge 5e is 45° as shown in FIG. 4, $L_x = L_y$ and therefore, the amount of deviation in the sub-scanning direction (the direction A or B) and the amount of deviation ($L - L_O$) in the main scanning direction are in the relation of 1:1, and from the difference between L′ picture elements found from the output of the line sensor and the center value $L_{O'}$ picture elements, it will be seen that when the reading density of the original is 400 DPI (63.5 μm per picture element), assuming that for example, $L' - L_{O'} = -2$ picture elements are obtained, the line sensor is reading a position deviating by 0.127 mm in the direction A relative to the center C of the slit.

The characteristic portion of the present embodiment will now be described. In the present embodiment, the relative positional relationship between the slit 5 of the first scanning optical system and the line sensor 10 is detected at a plurality of detecting positions. That is, in the present embodiment, provision is made of a processing circuit 17 for controlling the scanning of the first scanning optical system so that the detection by relative position detecting means provided with the chart opening portion 12, etc. can be effected at a plurality of scanning positions (detecting positions) of the first scanning optical system.

Figure 5A:
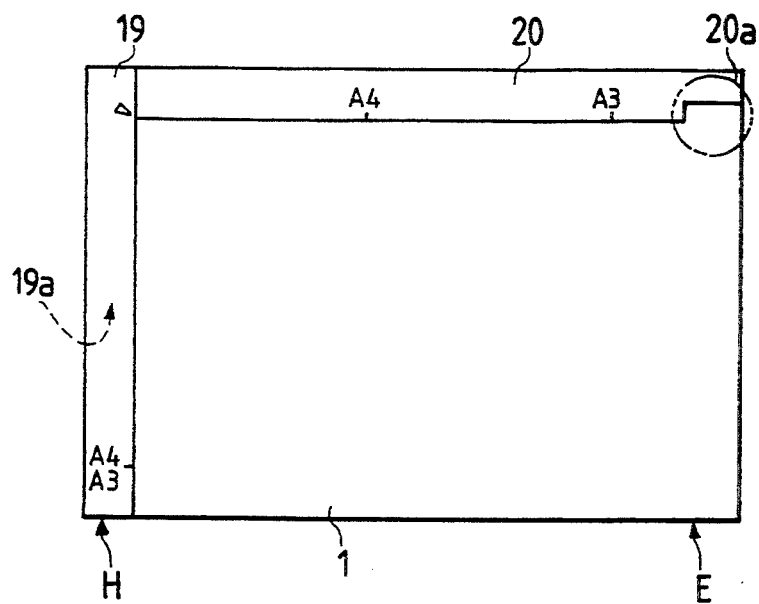
FIGS. 5A and 5B show the marginal portion of an original supporting table in the embodiment of the present invention.

Specifically, in the present embodiment, the plurality of detecting positions by the relative position detecting means, as shown in FIG. 5A, are the home position H on the scanning starting side and the end position E on the scanning ending side. The home position H is the scanning starting position of the first optical system, and the end position E corresponds to the scanning ending position of the first scanning optical system.

Around the original supporting table, reference members which provide the positioning reference of the original when the original is placed on the original supporting table, i.e., face plates 19 and 20, are provided in a direction orthogonal to the scanning direction and along the scanning direction.

A shading correcting plate 19a which is a standard white member is provided on the back of the face plate 19. This shading correcting plate 19a is at a location corresponding to the home position H of the first scanning optical system. The shading correcting plate 19a extends sufficiently long so as to cover the distance between the chart opening portions provided in the opposite end portions of the slit, and this shading correcting plate 19a can be reliably read by the line sensor through the chart opening portions.

That edge of the face plate 20 corresponding to the end position E which is adjacent to the original supporting table glass 1 is cut away as shown in FIG. 5A to form a cut-away portion 20a. When the first scanning optical system is at the end position E, the chart opening portion 12 in the end portion of the slit is exposed through this cut-away portion 20a so that it can be seen from the original supporting table.

As described above, in the present embodiment, the detection of the relative positional relationship between the slit and the line sensor is effected both when the first scanning optical system is at the home position H and when the first scanning optical system is at the end position E.

The apparatus body, as shown in FIG. 1, is provided with the aforementioned processing means 15 for processing the output information obtained from the relative position detecting means, a display unit 18 for controlling the result of the processing of the processing means 15 by the processing circuit 17 and displaying it, and the relative position adjusting means 16 for adjusting the relative position between the slit 5 of the first scanning optical system and the line sensor 10 in conformity with the result of the display by the display unit 18.

Accordingly, on the basis of the results detected at the plurality of, detecting positions, the positional relationship between the slit and the line sensor is adjusted by the relative position adjusting means 16.

The relative position adjusting means 16 is comprised of height adjusting means 21 for adjusting the deviation of the slit 5 of the first scanning optical system in the height direction, and horizontal direction adjusting means 22 for adjusting the deviation of the slit 5 of the first scanning optical system in the horizontal direction.

The height adjusting means 21, as shown in FIG. 6, has a hexagonal bolt 21a provided at a location in the front of the frame member 100 of the image reading apparatus.

Figure 7:
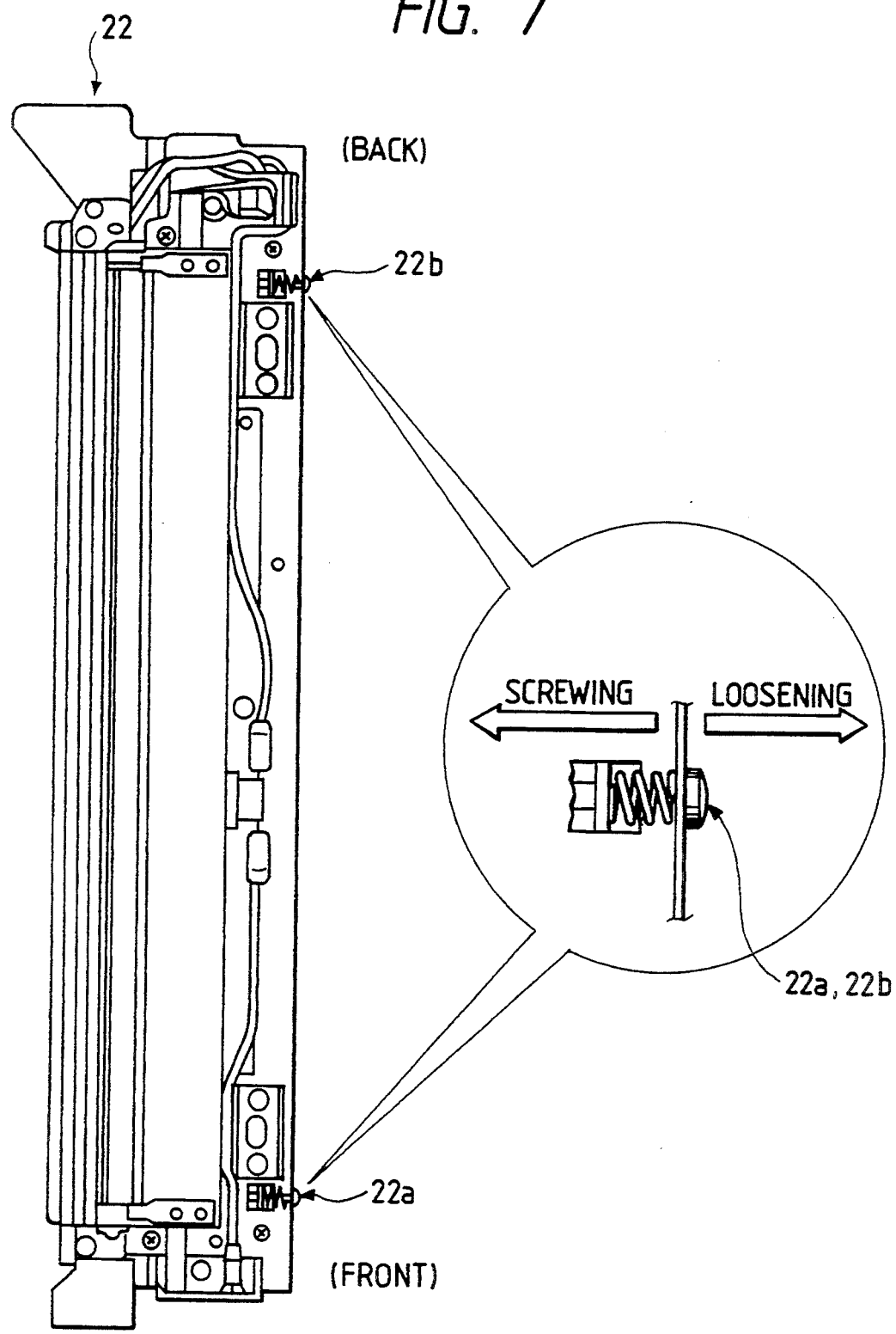
FIG. 7 shows horizontal direction adjusting means in the embodiment of the present invention.

Also, the horizontal direction adjusting means 22, as shown in FIG. 7, has adjust screws 22a and 22b provided between the supporting portions 11a, 11b, 11c, 11d, 11e and the slit 5 of the first scanning optical system.

The action in the characteristic portion of the present embodiment of the above-described construction will now be described with reference to the flow chart of FIG. 8.

Figure 5B:
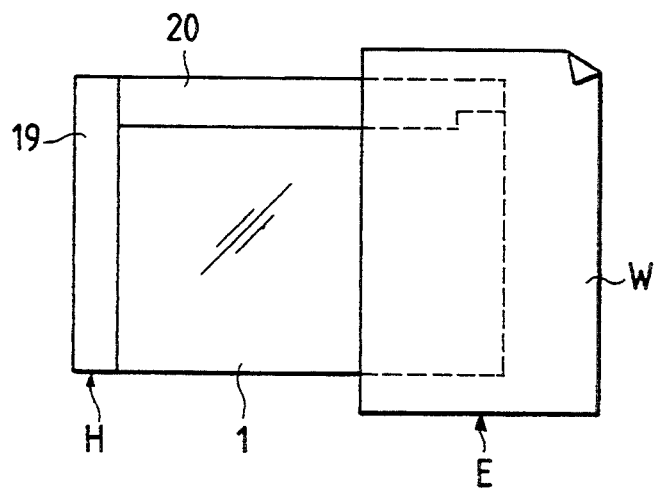

As shown in FIG. 5B, white copying paper W or the like is first placed on the right end of the original Supporting table glass 1, and then an original supporting table cover 24 shown in FIG. 6 is closed (step 1).

Figure 9A:
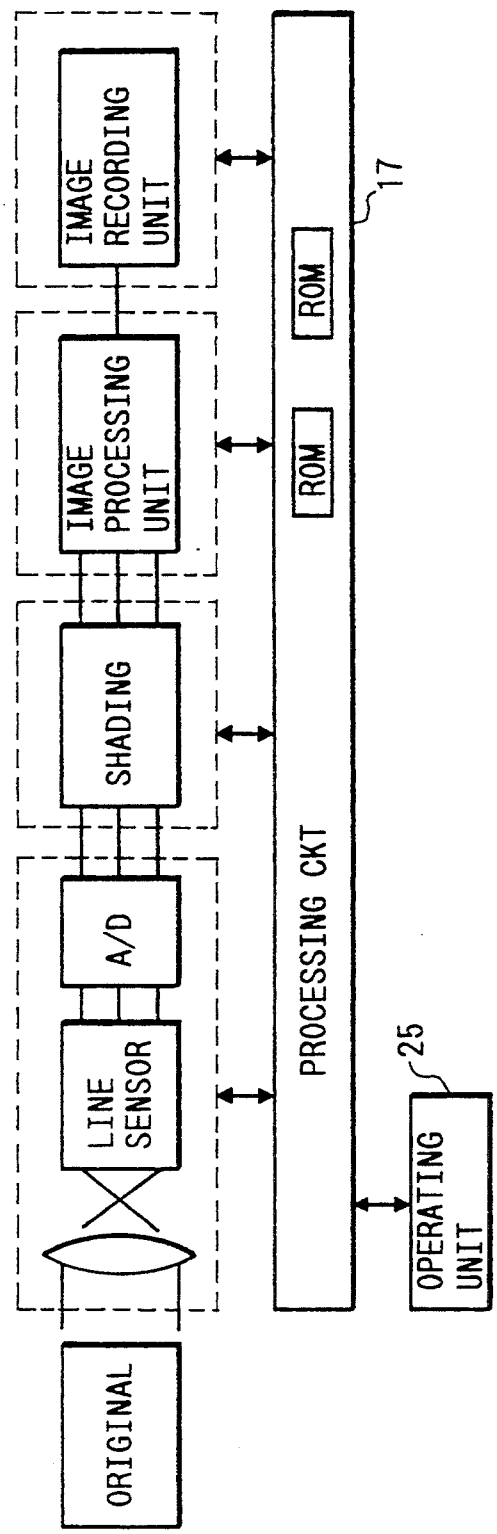
FIG. 9A shows the relation between an operating unit and an apparatus body in the embodiment of the present invention.

Subsequently, as a service mode, the slit adjust mode for adjusting the relative positional relationship between the slit 5 and the line sensor 10 is selected by an operating unit 25 shown in FIG. 9A.

Thereupon, the relative positional relationship between the slit 5 and the line sensor 10 at the home position H corresponding to the shading correcting plate 19a of the original supporting table 1 is detected by the relative position detecting means (step 3).

Subsequently, the first scanning optical system is moved toward the end position E and when it comes to the end position E, it is controlled by the processing circuit 17 so as to stop at the end position E. The relative positional relationship between the slit 5 and the line sensor 10 at the end position E is then detected by the relative position detecting means (step 4).

As previously described, L' picture elements corresponding to the output interval between the edge 13a of the rectangular opening portion and the edge 5e of the slit is compared with the center value by the processing means 15, whereby the deviation of the positional relationship between the slit 5 and the line sensor 10 is detected as sensor output values at four points, i.e., the front F of the home position H (the front of the home), the back R of the home position H (the back of the home), the front F of the end position E (the front of the end) and the back R of the end position E (the back of the end) (step 5).

If the positional relationship between the slit 5 and the line sensor 10 deviates so greatly that the light passed through the chart opening portion 12 does not enter the line sensor 10, the deviation of the positional relationship is detected as an error value.

How many times and in which direction the hexagonal bolt 21a should be rotated to correct the deviation in the height direction and how many times and in which direction the adjust screws 22a and 22b should be rotated to correct the deviation in the horizontal direction are calculated by the processing means 15 on the basis of the values of deviation or the error values at the four points, i.e., the front and back of the home and the front and back of the end (step 6).

Figure 9B:
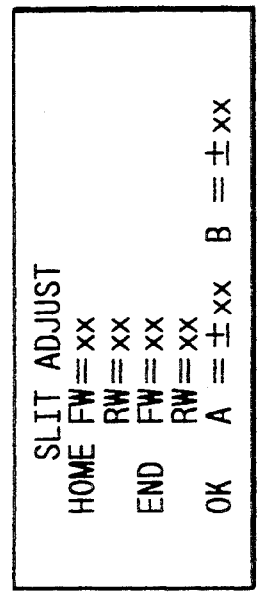
FIG. 9B shows a display panel in the embodiment of the present invention.

The values of deviation at the four points, i.e., the front and back of the home and the front and back of the end, and the calculated number of revolutions and direction in which the hexagonal bolt 21a should be rotated and the calculated number of revolutions and direction in which the adjust screws 22a and 22b should be rotated are displayed on the display unit 18, as shown in FIG. 9B (step 7).

If there is no deviation in either of the height direction and the horizontal direction and the slit 5 and the line sensor 10 are in right relative positional relationship, the processing means 15 will cause the display unit 18 to display a mark "OK" on the left downward portion of the screen of the display unit 18 (step 8).

If the mark "OK" is not displayed on the display unit 18, the operation of adjusting the relative position adjusting means 16 having the hexagonal bolt 21a and the adjust screws 22a and 22b is entered (step 9).

If as a result of the adjustment, the mark "OK" is displayed on the display unit 18, the slit adjustment in the service mode is finished.

As described above, in the present embodiment, the relative positional relationship between the slit 5 and the line sensor 10 is detected at a plurality of positions in the sub-scanning direction which is the direction of movement of the scanning means and therefore, the relative positional relationship can be read and adjusted with higher accuracy.

Also, the cut-away portion 20a is formed in that edge of the face plate 20 which is adjacent to the original supporting table glass 1, whereby a standard original such as white paper placed on the cut-away portion 20a can be reliably read through the chart opening portion and the inconvenience that the edge of the face plate 20 casts its shadow onto the chart opening portion to thereby cause wrong detection can be avoided.

Also, the home position H and the end position E are used as the detecting positions, whereby the farthest position in the sub-scanning direction is detected and thus, the detection accuracy increases. In addition, when the end position E is cut away, the appearance is better than when the intermediate portion between the home H and the end E and the quality of appearance is improved.

Also, the relative position adjusting means 16 is comprised of the height direction adjusting means 21 and the horizontal direction adjusting means 22, whereby the adjustment by the relative position adjusting means is accomplished with good accuracy.

Figure 10:
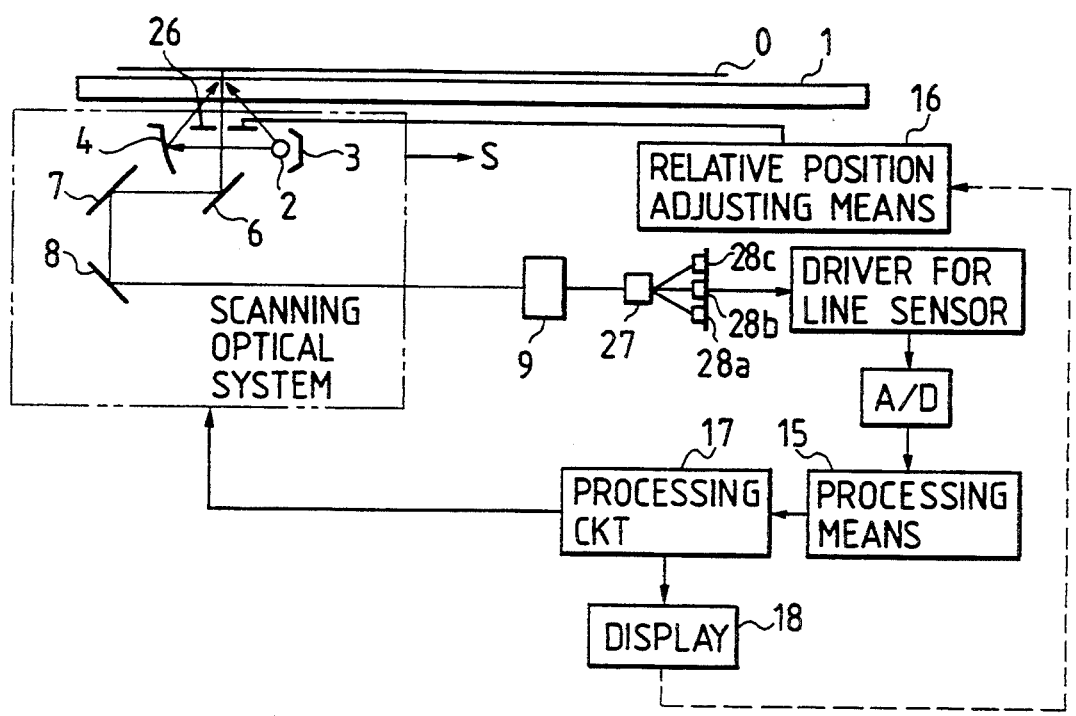
FIG. 10 is a schematic diagram of an image reading apparatus which is another embodiment of the present invention.

An apparatus shown in FIG. 10 is one in which image light from a colored original 0' is regulated by a slit 26 and the image light passed through this slit 26 is color-resolved by a diffraction grating 27 and image lights of respective colors are read by line sensors 28a, 28b and 28c.

The opening portion of the slit 26 in this apparatus is very narrow and the mutual positional accuracy of the slit 26, the diffraction grating 27 and the line sensors 28a, 28b, 28c is very severe.

Accordingly, it is very effective to apply the present invention to such an apparatus using the diffraction grating.

In the above-described embodiment, the detecting positions by the relative position detecting means are two, but may of course be three or more, and from the viewpoint of accuracy, a greater number of detecting positions is more preferable.

Also, in the above-described embodiment, a shading correcting plate is provided on the back of the face plate, but the location of the shading correcting plate is not limited to such location.

Also, on the original scanning starting side, the position for detecting the relative positional relationship between the slit and the line sensor is set at the home position, but it is not limited to the home position if it is a position at which the standard white member can be read.

While the embodiments of the present invention have been described above, the present invention is not restricted to the above-described embodiments, but permits all modifications within the technical idea of the present invention.

What is claimed is:

1. An image reading apparatus comprising:
    scanning means movable to scan an original, and having a slit for passing therethrough a part of light from the original;
    a sensor for reading the light passed through said slit; and
    detecting means for detecting the relative positional relationship between said slit and said sensor;
    the detection by said detecting means being effected at a plurality of detecting positions in the direction of movement of said scanning means.

2. An image reading apparatus according to claim 1, wherein one of said plurality of detecting positions is on the scanning starting side of said scanning means.

3. An image reading apparatus according to claim 2, wherein a white member to be read by said sensor is provided at the detecting position on said scanning starting side.

4. An image reading apparatus according to claim 2, wherein the detecting position on said scanning starting side is the home position at which said scanning means starts its scanning.

5. An image reading apparatus according to claim 1, wherein one of said plurality of detecting positions is on the scanning ending side of said scanning means.

6. An image reading apparatus according to claim 5, wherein the detecting position on said scanning ending side is the end position at which said scanning means ends its scanning.

7. An image reading apparatus according to claim 1, wherein an opening portion for the detection by said detecting means is provided in the end portion of said slit.

8. An image reading apparatus according to claim 1, wherein the result of the detection by said detecting means is displayed on a display unit provided in the body of the apparatus.

9. An image reading apparatus according to claim 1, further comprising height adjusting means for adjusting the position of said slit in the height direction thereof.

10. An image reading apparatus according to claim 1, further comprising horizontal adjusting means for adjusting the position of said slit in the horizontal direction thereof.

11. An image reading apparatus according to claim 1, wherein said slit extends long in a direction orthogonal to the direction of movement of said scanning means, and said sensor is a line sensor arranged in the form of a straight line in the direction orthogonal to the direction of movement of said scanning means.

12. An image reading apparatus according to claim 1, wherein a diffraction grating for color-resolving light is provided in the optical path between said slit and said sensor.

13. An image reading apparatus comprising:
    an original supporting table for supporting an original thereon;
    a reference member providing the positioning reference of the original placed on said original supporting table, and having a cut-away portion;
    scanning means movable to scan the original placed on said original supporting table, and having a slit for passing therethrough part of light from the original;
    a sensor for reading the light passed through said slit; and
    detecting means for detecting the relative positional relationship between said slit and said sensor;
    the detection by said detecting means being effected when said scanning means is at a position corresponding to said cut-away portion.

14. An image reading apparatus according to claim 13, wherein said reference member effects the positioning of the end portion of the original parallel to the direction of movement of said scanning means, and said cut-away portion is provided on the scanning ending side of said scanning means.

15. An image reading apparatus according to claim 14, wherein said cut-away portion is provided at the end position at which said scanning means ends its scanning.

16. An image reading apparatus according to claim 13, wherein the detection by said detecting means is further effected at another detecting position differing from said cut-away portion.

17. An image reading apparatus according to claim 16, wherein said another detecting position is on the scanning starting side of said scanning means.

18. An image reading apparatus according to claim 17, wherein a white member to be read by said sensor is provided at the detecting position on said scanning starting side.

19. An image reading apparatus according to claim 17, wherein the detecting position on said scanning starting side is the home position at which said scanning means starts its scanning.

20. An image reading apparatus according to claim 13, wherein an opening portion for the detection by said detecting means is provided in the end portion of said slit.

21. An image reading apparatus according to claim 20, wherein said opening portion is exposed on said original supporting table by said cut-away portion.

22. An image reading apparatus according to claim 13, wherein the result of the detection by said detecting means is displayed on the display unit provided in the body of the apparatus.

23. An image reading apparatus according to claim 13, further comprising height adjusting means for adjusting the position of said slit in the height direction thereof.

24. An image reading apparatus according to claim 13, further comprising horizontal adjusting means for adjusting the position of said slit in the horizontal direction thereof.

25. An image reading apparatus according to claim 13, wherein said slit extends long in a direction orthogonal to the direction of movement of said scanning means, and said sensor is a line sensor arranged in the form of a straight line in the direction orthogonal to the direction of movement of said scanning means.

26. An image reading apparatus according to claim 13, wherein a diffraction grating for color-resolving light is provided in the optical path between said slit and said sensor.

* * * * *

UNITED STATES PATENT AND TRADEMARK OFFICE
CERTIFICATE OF CORRECTION

PATENT NO. : 5,412,201
DATED : May 2, 1995
INVENTOR(S) : NOBUMASA FUKUZAWA, ET AL

It is certified that error appears in the above-indentified patent and that said Letters Patent is hereby corrected as shown below:

<u>ON TITLE PAGE</u>   Item [54] and Column 1, line 2,

"SPLIT" should read --SLIT--

<u>COLUMN 1</u>

Line 2, "SPLIT" should read --SLIT--.
Line 66, "senosr" should read --sensor--.

<u>COLUMN 5</u>

Line 22, "of," should read --of--.
Line 45, "Sup-" should read --sup- --.

Signed and Sealed this

Eighth Day of August, 1995

Attest:

BRUCE LEHMAN

Attesting Officer        Commissioner of Patents and Trademarks